US010590771B2

(12) United States Patent
Lucas et al.

(10) Patent No.: US 10,590,771 B2
(45) Date of Patent: Mar. 17, 2020

(54) ROTARY FLUID PRESSURE DEVICE WITH DRIVE-IN-DRIVE VALVE ARRANGEMENT

(71) Applicant: Eaton Intelligent Power Limited, Dublin 4 (IE)

(72) Inventors: Jay Paul Lucas, Plymouth, MN (US); Todd Dean Degler, Chaska, MN (US)

(73) Assignee: Eaton Intelligent Power Limited, Dublin (IE)

( * ) Notice: Subject to any disclaimer, the term of this patent is extended or adjusted under 35 U.S.C. 154(b) by 305 days.

(21) Appl. No.: 15/527,677

(22) PCT Filed: Nov. 16, 2015

(86) PCT No.: PCT/US2015/060857
§ 371 (c)(1),
(2) Date: May 17, 2017

(87) PCT Pub. No.: WO2016/081358
PCT Pub. Date: May 26, 2016

(65) Prior Publication Data
US 2017/0362938 A1 Dec. 21, 2017

Related U.S. Application Data

(60) Provisional application No. 62/080,986, filed on Nov. 17, 2014.

(51) Int. Cl.
*F01C 21/00* (2006.01)
*F01C 21/08* (2006.01)
(Continued)

(52) U.S. Cl.
CPC ............ *F01C 21/008* (2013.01); *F01C 1/104* (2013.01); *F01C 21/08* (2013.01); *F01C 21/18* (2013.01); *F16K 31/44* (2013.01)

(58) Field of Classification Search
CPC ........ F01C 21/008; F01C 1/104; F01C 21/08; F03C 2/08; F04C 15/0061;
(Continued)

(56) References Cited

U.S. PATENT DOCUMENTS 3,572,983 A   3/1971   McDermott
4,004,866 A   1/1977   Ohrberg
(Continued)

FOREIGN PATENT DOCUMENTS

CN   2109472 U   7/1992
CN   1216346 A   5/1999
(Continued)

OTHER PUBLICATIONS

Extended European Search Report for corresponding European Patent Application No. 15861774.6 dated Jun. 29, 2018, 5 pages.
(Continued)

*Primary Examiner* — Deming Wan
(74) *Attorney, Agent, or Firm* — Merchant & Gould P.C.

(57) ABSTRACT

A rotary fluid pressure device, such as a low-speed, high-torque gerotor motor, is provided with a valve drive shaft that is partially inserted into and engaged with a main drive shaft as the main drive shaft engages a rotating output shaft and engages a rotating and orbiting star member of a positive displacement device. The device is also provided with a drive retainer configured to retain the engagement of the main drive shaft and the valve drive shaft.

15 Claims, 4 Drawing Sheets

(51) Int. Cl.
*F03C 2/08* (2006.01)
*F04C 15/00* (2006.01)
*F16K 31/44* (2006.01)
*F16K 31/53* (2006.01)
*F04C 2/10* (2006.01)
*F16D 1/10* (2006.01)
*F01C 21/18* (2006.01)
*F01C 1/10* (2006.01)

(58) Field of Classification Search
CPC .......... F04C 2/103–106; F16K 11/074; F16K 31/523; F16C 3/023; F16D 2001/103; Y10T 403/7026
USPC ............... 418/61.3, 72.166, 268; 464/182
See application file for complete search history.

(56) References Cited

U.S. PATENT DOCUMENTS

| | | | |
|---|---|---|---|
| 4,449,898 A | 5/1984 | Lambeck | |
| 4,533,302 A | 8/1985 | Begley | |
| 4,917,585 A * | 4/1990 | Niemiec | F04C 2/104 137/625.2 |
| 4,992,034 A | 2/1991 | Uppal | |
| 5,061,160 A | 10/1991 | Kinder et al. | |
| 5,100,310 A | 3/1992 | Uppal | |
| 5,211,551 A * | 5/1993 | Uppal | F04C 2/086 418/61.3 |
| 5,228,846 A * | 7/1993 | Lammers | F04C 2/104 418/61.3 |
| 5,407,336 A | 4/1995 | White | |
| 5,624,248 A * | 4/1997 | Kassen | F04C 2/104 418/132 |
| 6,033,195 A | 3/2000 | Uppal | |
| 9,175,563 B2 | 11/2015 | Attarde et al. | |
| 9,551,222 B2 | 1/2017 | Lucas | |
| 2005/0271536 A1* | 12/2005 | White | F04C 2/104 418/61.3 |
| 2010/0150761 A1 | 6/2010 | Larsen et al. | |

FOREIGN PATENT DOCUMENTS

| | | | |
|---|---|---|---|
| CN | 1703582 A | 11/2005 | |
| CN | 104074853 A | 10/2014 | |
| EP | 0 492 348 A1 | 7/1992 | |
| EP | 0492348 A1 * | 7/1992 | ............. F04C 2/104 |
| JP | 2001-082313 A | 3/2001 | |

OTHER PUBLICATIONS

Chinese Office Action for corresponding Chinese Patent Application No. 201580061219.5 dated Jul. 13, 2018, 10 pages.
International Search Report and Written Opinion of the International Searching Authority for corresponding International Patent Application No. PCT/US2015/060857 dated Mar. 8, 2016, 11 pgs.

* cited by examiner

ROTARY FLUID PRESSURE DEVICE WITH DRIVE-IN-DRIVE VALVE ARRANGEMENT

CROSS-REFERENCE TO RELATED APPLICATION

This application is a National Stage Application of PCT/US2015/060857, filed on Nov. 16, 2015, which claims the benefit of U.S. Patent Application Ser. No. 62/080,986, filed on Nov. 17, 2014, the disclosures of which are incorporated herein by reference in their entireties. To the extent appropriate, a claim of priority is made to each of the above disclosed applications.

BACKGROUND

A gerotor motor typically includes a housing defining inlet and outlet ports and a gerotor gear set defining expanding and contracting volume chambers. The motor further includes a valve arrangement to provide fluid communication between the ports and the volume chambers of the gerotor gear set. In certain cases, the gerotor gear set includes an externally-toothed star member that rotates and orbits around an internally-toothed ring member.

In certain gerotor motors, a gerotor motor has a two-piece valve drive including a main drive shaft and a valve drive shaft, and a valve arrangement disposed behind the gerotor mechanism opposite to the output shaft. In this configuration, the main drive shaft is used to transmit torque from the orbiting and rotating star member to a rotating output shaft, and the valve arrangement can be driven at a speed of rotation of the star member by means of the valve drive shaft which is in splined engagement with both the valve arrangement and the star member, as disclosed in U.S. Pat. No. 4,992,034.

In the gerotor motor employing such a two-piece valve drive, a portion of an axial length of the spines defined by the star member is required to drive the valve drive shaft to rotate and orbit as the star member rotates and orbits. Therefore, the spline connection between the star member and the drive valve shaft takes up a significant portion of the splines of the star member.

SUMMARY

The present disclosure generally relates to a rotary fluid pressure device such as a low-speed, high-torque gerotor motor. In one possible configuration and by non-limiting example, the rotary fluid pressure device includes a valve drive shaft that is partially inserted into and engaged with a main drive shaft, and that is retained by a drive retainer to prevent lift-off of a valve arrangement. Various aspects are described in this disclosure, which include, but are not limited to, the following aspects.

In certain aspects, a rotary fluid pressure device includes a housing assembly, a positive displacement device, a valve mechanism, a main drive shaft, and a valve drive shaft. The housing assembly may include an output shaft housing and a valve housing section. The output shaft housing is configured to rotatably support an output shaft, and the valve housing section defines a fluid inlet and a fluid outlet. The positive displacement device is associated with the housing assembly and includes a ring member and a star member. The star member is eccentrically disposed within the ring member for relative orbital and rotational movement to define expanding and contracting fluid volume chambers resulting from the orbital and rotational movement. The valve mechanism may include a valve spool that is rotatably disposed at the valve housing section and cooperates with the housing assembly to provide fluid communication between the fluid inlet and the expanding fluid volume chambers and between the contracting fluid volume chambers and the fluid outlet. The main drive shaft has a forward end and a rearward end. The main drive shaft is configured to engage the output shaft at the forward end and engage the star member at the rearward end to transmit torque between the output shaft and the ring member.

To reduce an axial length of the star member that engages the main drive shaft and the valve drive shaft, the main drive shaft may have a hollow at the rearward end for receiving the valve drive shaft. The valve drive shaft has a forward end and a rearward end, and the valve drive shaft is at least partially received within the hollow of the main drive shaft and engages the main drive shaft within the hollow at the forward end of the valve drive shaft, while the valve drive shaft engages the valve spool at the rearward end of the valve drive shaft to transmit torque between the main drive shaft and the valve spool. In certain examples, the engagement between the main drive shaft and the valve drive shaft is generally aligned with the positive displacement device.

To prevent lift-off of the valve mechanism, the rotary fluid pressure device may include a drive retainer configured to retain the engagement of the main drive shaft with the star member and the engagement of the valve drive shaft with the main drive shaft. In certain examples, the drive retainer may be arranged and configured to contact an axial end surface of the star member as the star member rotates and orbits around the ring member of the positive displacement device.

The above features and advantages and other features and advantages of the present teachings are readily apparent from the following detailed description of the best modes for carrying out the present teachings when taken in connection with the accompanying drawings.

DETAILED DESCRIPTION

Figure 1:
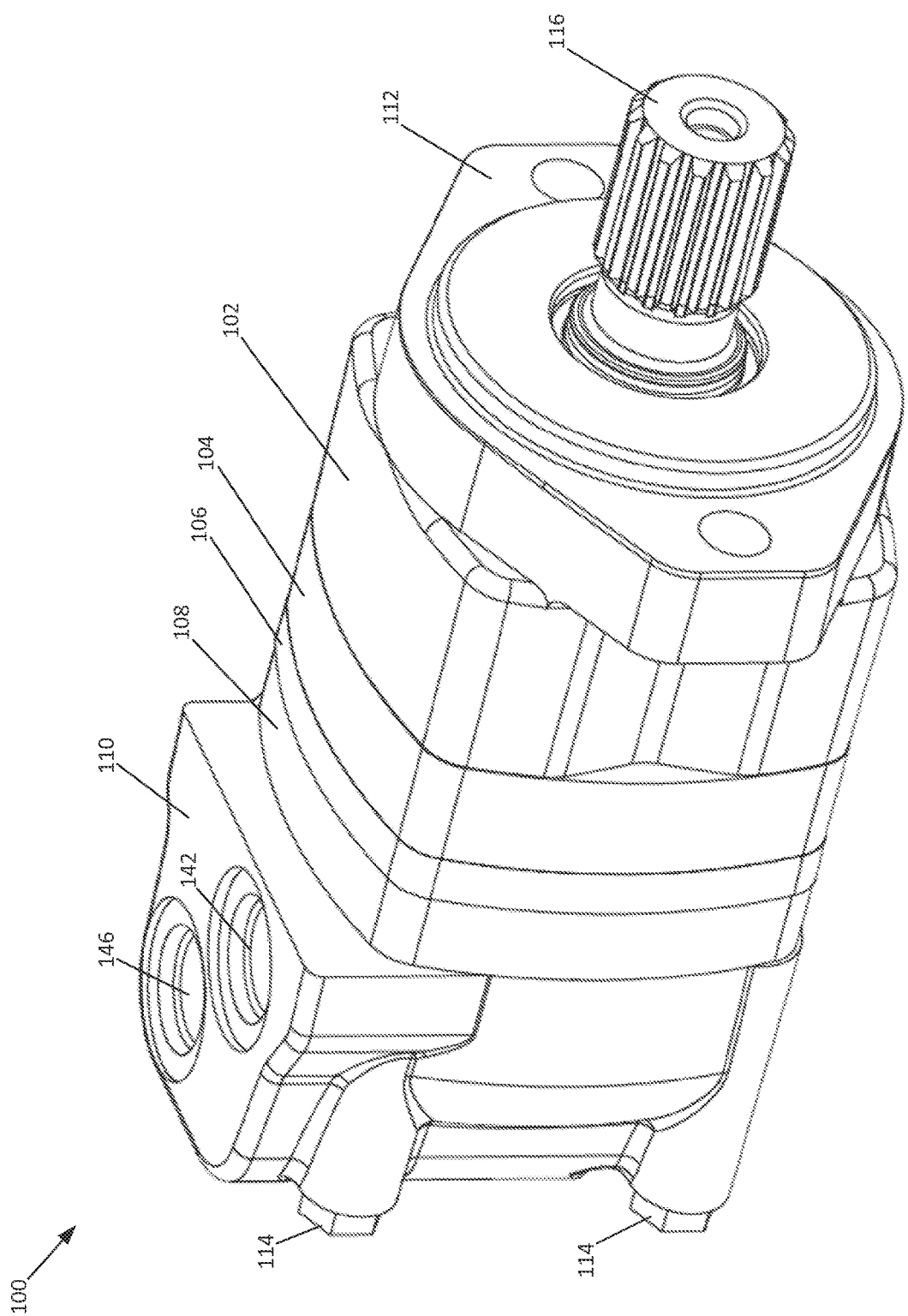
FIG. 1 is a perspective view of an example low-speed, high torque gerotor motor 100 in accordance with the principles of the present disclosure.

Various examples will be described in detail with reference to the drawings, wherein like reference numerals represent like parts and assemblies throughout the several views.

Figure 3:
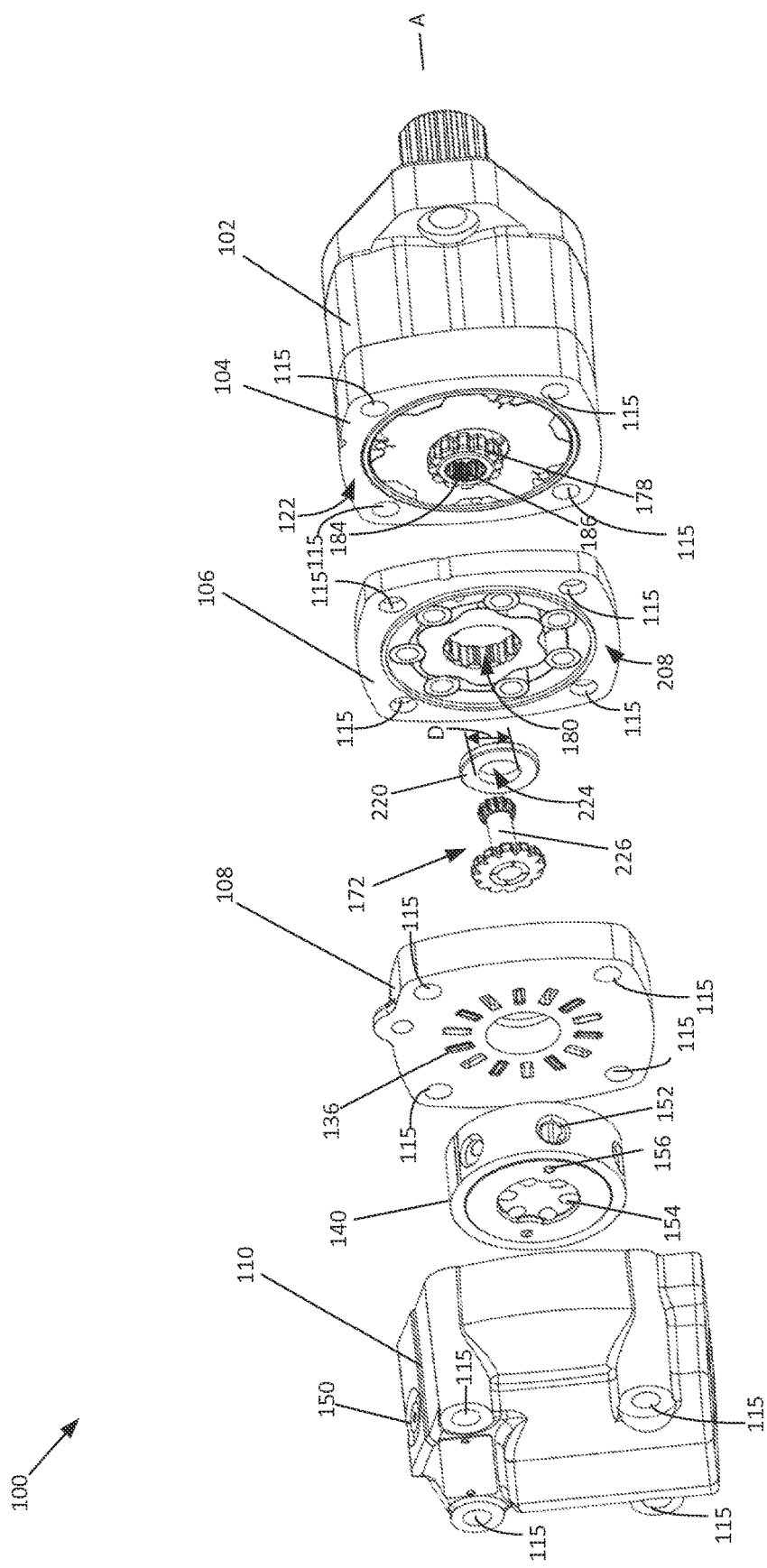
FIG. 3 is a rearward exploded view of the gerotor motor of FIG. 1.

Referring to FIG. 1, an example low-speed, high torque gerotor hydraulic motor 100 is provided in accordance with the principles of the present disclosure. In this document, the hydraulic motor 100 is also referred to as a rotary fluid pressure device. The hydraulic motor 100 may include a shaft support casing 102, a wear plate 104, a gerotor displacement mechanism 106, a port plate 108, a valve housing section 110. The shaft support casing 102 includes a mounting flange 112 configured to mount the motor 100 to a predetermined location. The shaft support casing 102, the wear plate 104, the gerotor displacement mechanism 106, the port plate 108, and the valve housing section 110 may be secured together by a plurality of fasteners 114 configured to pass through fastening holes 115 (FIG. 3).

Figure 2:
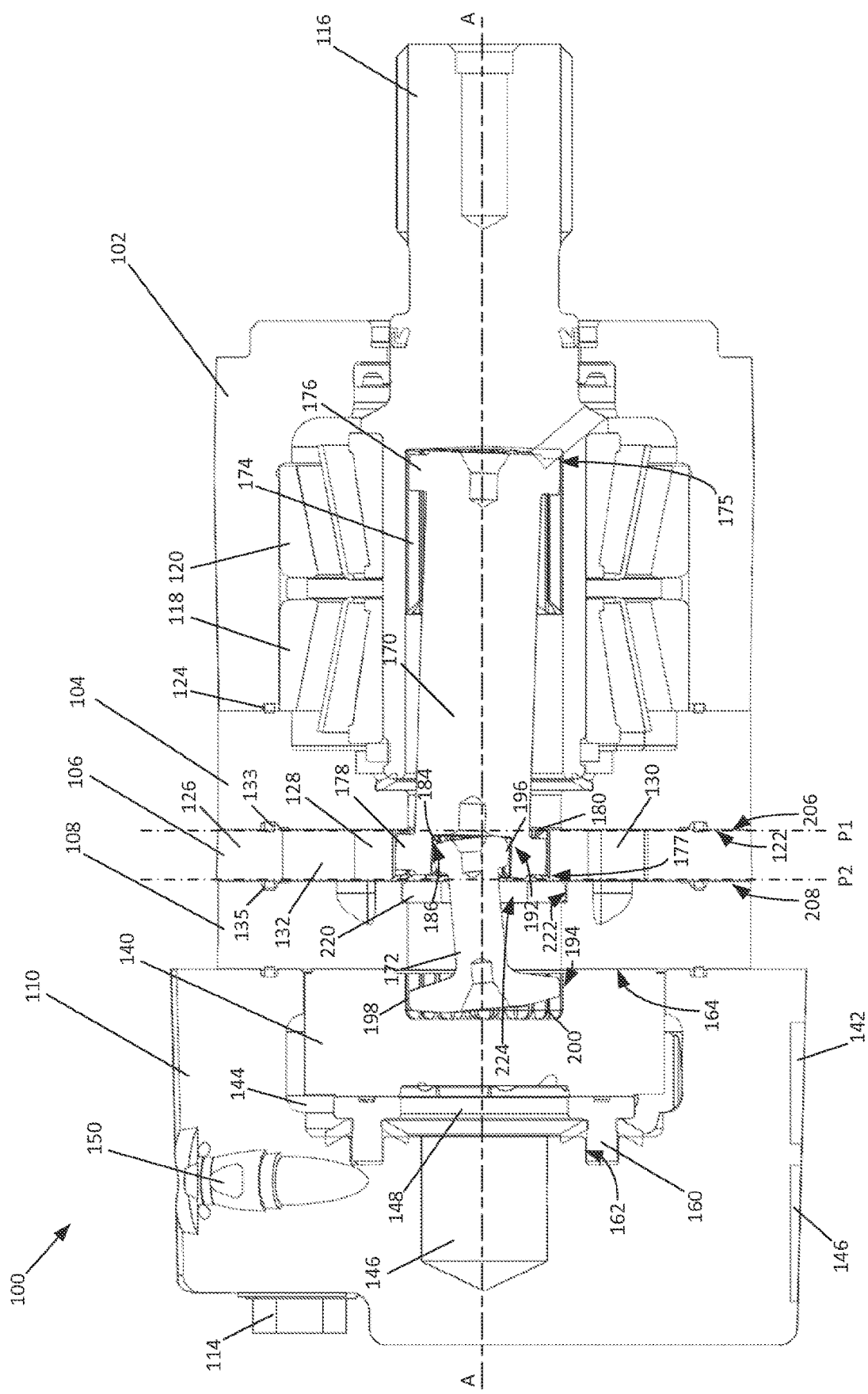
FIG. 2 is a cross-sectional view of the gerotor motor 100 of FIG. 1.

Referring to FIG. 2, the hydraulic motor 100 includes an output shaft 116 that is positioned within the shaft support casing 102 and rotatably supported therein by one or more bearing elements 118 and 120. Disposed adjacent a rearward end of the bearing element 118 is the wear plate 104 configured to retain the output shaft 116 and the bearing elements 118 and 120 in place within the shaft support casing 102.

The wear plate 104 defines an axial end surface 122 configured to engage an adjacent end surface of the gerotor displacement mechanism 106 (e.g., its ring member 126 and star member 128). In some examples, an annular sealing member (e.g., an O-ring) 124 is disposed between the engaging end surfaces of the wear plate 104 and the shaft support casing 102.

The gerotor displacement mechanism 106 may be a rotary-type positive displacement device and includes an internally-toothed ring member 126 and an externally-toothed star member 128. In some examples, the ring member 126 includes a plurality of rollers 130 serving as the internal teeth. The star member 128 is eccentrically disposed within the ring member 126 and may have one less tooth than the ring member 126. In some examples, the star member 128 orbits and rotates relative to the ring member 126, and this orbital and rotational movement defines a plurality of expanding and contracting fluid volume chambers 132. Although it is described that the ring member is fixed and the star member orbits and rotates, it should be clearly understood by those skilled in the art that either the ring member or the star member can have either the orbital or rotational movement, or both, in accordance with the principles of the present disclosure. Further, it is apparent that the present disclosure is not necessarily limited to a gerotor as the fluid displacement mechanism. An example gerotor displacement mechanism 104 is further described in U.S. Pat. Nos. 4,533,302 and 4,992,034, both of which are hereby incorporated by reference in their entireties.

Figure 4:
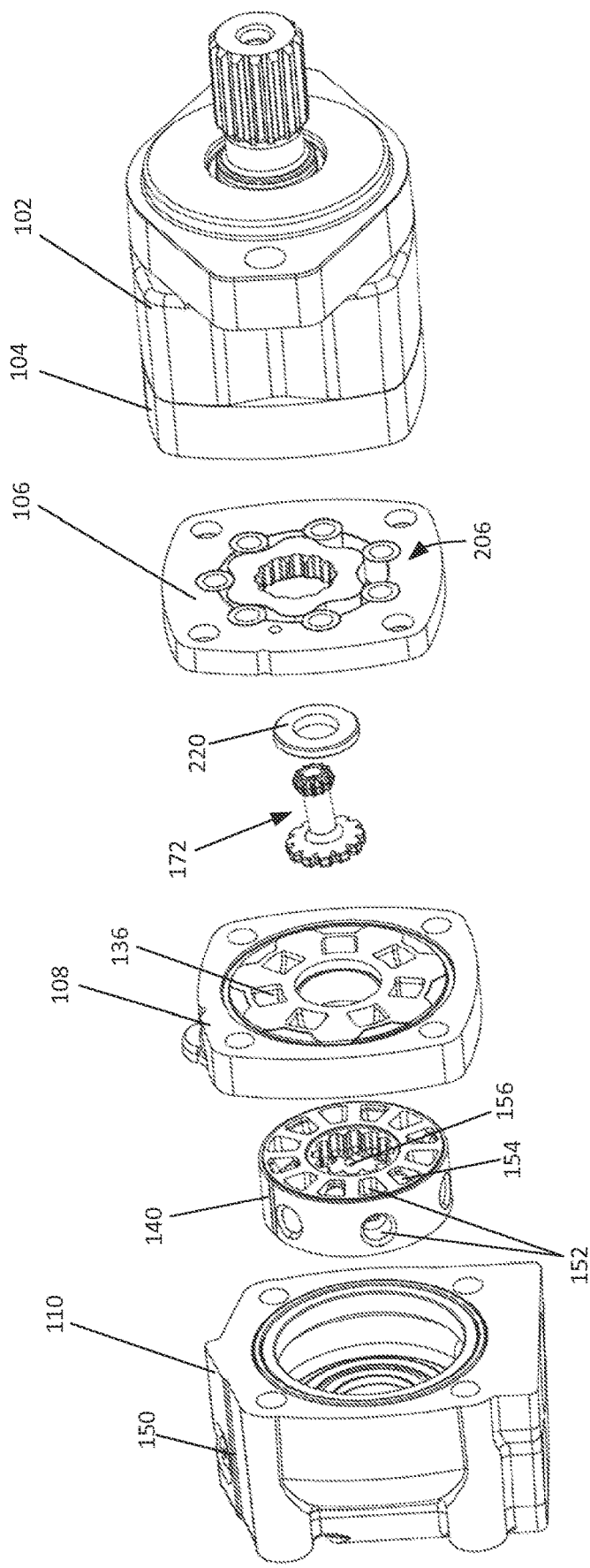
FIG. 4 is a forward exploded view of the gerotor motor of FIG. 1.

Referring to FIGS. 3 and 4, the port plate 108 defines a plurality of fluid passages 136, each of which is disposed to be in continuous fluid communication with the adjacent volume chamber 132. In the depicted example, the port plate 108 includes seven fluid passages 136 as the ring member 126 has seven internal teeth and thus defines seven fluid volume chambers 132.

As depicted in FIG. 2, an annular sealing member (e.g., an O-ring) 133 is disposed between the opposing axial end surfaces of the wear plate 104 and the gerotor displacement mechanism 106. Disposed also is another annular sealing member (e.g., an O-ring) 135 between the opposing axial end surfaces of the gerotor displacement mechanism 106 and the port plate 108.

Turning again to FIG. 2, the valve housing section 110 is configured to rotatably support a valve spool 140. The valve housing section 110 includes a fluid inlet port 142 (see also FIG. 1) in communication with an annular chamber 144 which surrounds the valve spool 140. The valve housing section 110 further includes a fluid outlet port 146 (see also FIG. 1) in fluid communication with a center chamber 148 disposed between the valve housing section 110 and the valve spool 140. The valve housing section 110 also includes a case drain port 150 (FIG. 3) that is plugged to force the case drain fluid to flow to whichever port 142 or 146 is at return pressure. The valve spool 140 defines a plurality of first valve passages 152 and a plurality of second valve passages 154. The first and second valve passages 152 and 154 are alternately arranged around the valve spool 140. The first valve passages 152 are in continuous fluid communication with the annular chamber 144, and the second valve passages 154 are in continuous fluid communication with the center chamber 148. In the depicted example, there are six first valve passages 152 and six second valve passages 154, corresponding to the six external teeth of the star member 128. The valve spool 140 may also define one or more angled drain passages 156.

The valve spool 140 may be biased toward the port plate 108 to maintain the valve spool 140 in sealing engagement with an adjacent surface 164 of the port plate 108, thereby preventing cross port leakage between the fluid chambers 144 and 148. In some examples, a valve seating mechanism 160 is employed to bias the valve spool 140 toward the port plate 108. The valve seating mechanism 160 is seated within an annular groove 162 defined by the valve housing section 110. The valve seating mechanism 160 can be in fluid communication with the drain passages 156. An example of the valve seating mechanism 160 is disclosed in U.S. Pat. Nos. 3,572,983 and 4,533,302, both of which are hereby incorporated by reference in their entireties.

Referring again to FIG. 2, the hydraulic motor 100 includes a main drive shaft 170 and a valve drive shaft 172. The output shaft 116 includes a set of internal, straight splines 174, which is configured to engage a set of forward splines 176 of the main drive shaft 170. The forward splines 176 of the main drive shaft 170 may be external, crowned splines formed on a forward end 175 of the main drive shaft 170. Formed at a rearward end 177 of the main drive shaft 170 is a set of rearward splines 178 of the main drive shaft 170. The rearward splines 178 may be external, crowned splines that are configured to engage a set of internal, straight splines 180 formed on an inner circumferential surface of the star member 128. In the depicted example, the ring member 126 includes seven internal teeth, and the star member 128 includes six external teeth. Thus, six orbits of the star member 128 result in one complete rotation thereof, and one complete rotation of the main drive shaft 170 and the output shaft 116.

Referring to FIGS. 2 and 3, the valve drive shaft 172 is at least partially received within the main drive shaft 170 and engaged with the main drive shaft 170 such that an interface between the main drive shaft 170 and the valve drive shaft 172 is generally aligned with the gerotor displacement mechanism 106.

In some examples, the main drive shaft 170 includes a hollow 184 at the rearward end 177 and has a set of inner splines 186 formed on an inner circumferential surface of the hollow 184. The inner splines 186 of the main drive shaft 170 may be straight splines. The hollow 184 of the main drive shaft 170 is configured to receive at least a portion of a forward end 192 of the valve drive shaft 172, and the inner splines 186 of the main drive shaft 170 at the rearward end 177 engages a set of forward external splines 196 formed around the forward end 192 of the valve drive shaft 172. In some examples, the forward splines 196 of the valve drive shaft 172 may be crowned splines. The valve drive shaft 172 has a set of rearward external splines 198 at a rearward end 194 thereof, which are configured to engage a set of internal splines 200 formed about an inner periphery of the valve spool 140. In some examples, the rearward splines 198 of the valve drive shaft 172 may be external, crowned splines, and the internal splines 200 of the valve spool 140 may be straight splines.

As illustrated, the engagement between the inner splines 186 of the main drive shaft 170 and the external splines 196 of the valve drive shaft 172 is arranged between opposite planes P1 and P2, which are defined by axial end faces 206 and 208 (see also FIGS. 3 and 4) of the gerotor displacement mechanism 106, respectively. For example, a first plane P1 is defined by the axial end face 206 of the gerotor displacement mechanism 106, and a second plane P2 is defined by the axial end face 208 of the gerotor displacement mechanism 106. In some examples, the interface between the inner splines 186 of the main drive shaft 170 and the external splines 196 of the valve drive shaft 172 is generally aligned with the interface between the external splines 178 of the main drive shaft 170 and the internal spline 180 of the star member 128.

As such, the configuration of the external splines 196 of the valve drive shaft 172 nested in the hollow 184 of the main drive shaft 170 requires a shorter axial length of the internal splines 180 of the star member 128 of the gerotor displacement mechanism 106, and thus maximizes the efficiency in use of the splines 180 of the star member 128. In certain cases, the lengths of the splines 186 of the main drive shaft 170 and the splines 196 of the valve drive shaft 172 can be maximized as a shorter axial length of the internal splines 180 of the star member 128 is required. Because the required spline length is reduced, the design of the present disclosure also provides a high eccentricity on a small displacement motor for improved starting torque efficiency. Further, this configuration also allows using the gerotor displacement mechanism 106 with a smaller width along axis of rotation A. The design in accordance with the present disclosure also reduces the running angles for both the main drive shaft 170 and the valve drive shaft 172, thereby increasing the life of the hydraulic motor 100. The design can reduce the need for case flow (e.g., leakage slots) and, thus, increase volumetric efficiency.

Referring again to FIGS. 2-4, the hydraulic motor 100 includes a drive retainer 220 for preventing lift-off of the spool valve 140 away from port plate 108. In the present disclosure, the lift-off can be defined as an axial separation of the spool valve 140 from the stationary port plate 108. The lift-off can occur when the main drive shaft 170 and/or the valve drive shaft 172 axially slide toward the spool valve 140 as the main drive shaft 170 and the valve drive shaft 172 rotate and orbit, cooperating with the gerotor displacement mechanism 106. The lift-off can cause substantial cross-port leakage and stalling of the motor 100.

In some examples, the drive retainer 220 may be inserted and seated into a recess 222 formed on the port plate 108. The drive retainer 220 is arranged adjacent an axial end surface of the star member 128 as the star member 128 rotates and orbits around the ring member 126 of the gerotor displacement mechanism 106. In some examples, the drive retainer 220 is arranged and configured to contact the axial end surface of the star member 128 during the rotation and orbiting of the star member 128.

The drive retainer 220 may be configured to retrofit the port plate 108 to utilize existing castings and/or blanks for manufacturing the port plate 108, thereby limiting increase in cost and speeding up implementation of the drive retainer 220. In other examples, the port plate 108 is specifically designed to mount the drive retainer 220 in place.

As depicted, the drive retainer 220 includes an opening 224 configured for a stem 226 (FIG. 3) of the valve drive shaft 172 to pass therethrough when the valve drive shaft 172 is installed in place. The opening 224 of the drive retainer 220 is configured to hold the forward end 192 of the valve drive shaft 192 within the hollow 186 of the main drive shaft 170 when the star member 128, the main drive shaft 170, and the valve drive shaft 172 together orbit about the ring member 126 of the gerotor displacement mechanism 106. In some examples, the center of the opening 224 of the drive retainer 220 is aligned with the axis of rotation A.

In some examples, the opening 224 of the drive retainer 220 is designed as a hole having a diameter D (FIG. 3). The diameter D is configured to be larger than the largest diameter of the valve drive shaft 172 at the forward end 192 such that the valve drive shaft 172 passes through the opening 224 of the drive retainer 220 during installation. The opening 224 is also configured to be smaller than the largest, outmost trace defined by the valve drive shaft 172 (i.e., the external splines 196 thereof) at the forward end 192 as the valve drive shaft 172 rotates and orbits around the ring member 128 of the gerotor displacement mechanism 106. This configuration is to prevent the valve drive shaft 172 from disengaging off or sliding out from the hollow 186 of the main drive shaft 170 and thus from the gerotor displacement mechanism 106. The largest, outmost orbital trace of the valve drive shaft 172 is defined by the external splines 196 of the valve drive shaft 172 at the forward end 192 when the valve drive shaft 172 is tilted and deviates from the axis of rotation A and orbits around the ring member 126 of the gerotor displacement mechanism 106.

In some examples, the opening 224 has a diameter smaller than the largest diameter of the main drive shaft 170 at the rearward end 177 so that the main drive shaft 170 is also prevented from being slid out from the gerotor displacement mechanism 106 during rotating and orbiting movement. In other examples, the opening 224 has a diameter smaller than the largest trace defined by the main drive shaft 170 (i.e., the external splines 178 thereof) at the rearward end 177 as the main drive shaft 170 orbits around the ring member 128 of the gerotor displacement mechanism 106.

As such, the drive retainer 220 is configured to prevent lift-off of the spool valve 140 from other valve components, such as the port plate 108. The lift-off would otherwise reduce volumetric efficiency and cause freewheeling.

In this document, the shaft support casing 102 and the wear plate 104 can be regarded as a unit and referred to as an output shaft housing. In some examples, the shaft support casing 102 and the wear plate 104 can be configured as an integral part. The output shaft housing (including the shaft support casing 102 and the wear plate 104) and the valve housing section 110 can be considered as a unit and referred to herein as a housing assembly. Further, the valve spool 140 can be regarded as a valve mechanism. In some examples, the valve mechanism can further include the port plate 108.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A rotary fluid pressure device comprising:
a housing assembly including an output shaft housing and a valve housing section, the output shaft housing configured to rotatably support an output shaft, and the valve housing section defining a fluid inlet and a fluid outlet;
a positive displacement device associated with the housing assembly and including a ring member and a star member, the star member eccentrically disposed within the ring member for relative orbital and rotational movement about an axis of rotation to define expanding and contracting fluid volume chambers resulting from the orbital and rotational movement;

a valve mechanism including a valve spool, the valve spool rotatably disposed at the valve housing section and cooperating with the housing assembly to provide fluid communication between the fluid inlet and the expanding fluid volume chambers, and between the contracting fluid volume chambers and the fluid outlet;

a main drive shaft having a forward end and a rearward end and including a hollow at the rearward end, the main drive shaft engaging the output shaft at the forward end of the main drive shaft and engaging the star member at the rearward end of the main shaft to transmit torque between the output shaft and the star member; and a valve drive shaft having a forward end and a rearward end, the valve drive shaft at least partially received within the hollow of the main drive shaft and engaging the main drive shaft within the hollow of the main drive shaft at the forward end of the valve drive shaft, and the valve drive shaft engaging the valve spool at the rearward end of the valve drive shaft, to transmit torque between the main drive shaft and the valve spool.

2. The device according to claim 1, wherein the engaging between the main drive shaft and the valve drive shaft is generally aligned with the positive displacement device.

3. The device according to claim 2, wherein the engaging of the valve drive shaft with the main drive shaft within the hollow thereof is arranged between opposite planes that are defined by axial end faces of the positive displacement device, respectively.

4. The device according to claim 1, wherein the valve drive shaft has forward splines externally formed at the forward end of the valve drive shaft, and the hollow of the main drive shaft has internal splines configured to engage the forward splines of the valve drive shaft.

5. The device according to claim 4, wherein the main drive shaft has rearward splines externally formed at the rearward end thereof, and the star member has internal splines formed on an inner circumferential surface thereof and configured to engage the rearward splines of the main drive shaft.

6. The device according to claim 5, wherein an engagement between the internal splines of the hollow of the main drive shaft and the forward splines of the valve drive shaft is generally aligned with the engagement between the rearward splines of the main drive shaft and the internal splines of the star member.

7. The device according to claim 5, wherein the forward splines of the valve drive shaft are crowned splines, and the internal splines of the hollow are straight splines.

8. The device according to claim 5, wherein the rearward splines of the main drive shaft are crowned splines, and the internal splines of the star member are straight splines.

9. The device according to claim 1, wherein the main drive shaft has forward splines externally formed at the forward end of the main drive shaft, and the output shaft has internal splines configured to engage the forward splines of the main drive shaft.

10. The device according to claim 1, wherein the valve drive shaft has rearward splines externally formed at the rearward end thereof, and the valve spool has internal splines formed about an inner periphery thereof and configured to engage the rearward splines of the valve drive shaft.

11. The device according to claim 1, further comprising a drive retainer configured to retain the engagement of the main drive shaft with the star member and the engagement of the valve drive shaft with the main drive shaft to prevent lift-off of the spool valve.

12. The device according to claim 11, wherein the drive retainer is arranged and configured to contact an axial end surface of the star member as the star member rotates and orbits around the ring member of the positive displacement device.

13. The device according to claim 11, wherein the drive retainer includes an opening configured for a stem of the valve drive shaft to pass through when the valve drive shaft is installed in place.

14. The device according to claim 13, wherein the opening of the drive retainer is configured to hold the forward end of the valve drive shaft within the hollow of the main drive shaft when the star member, the main drive shaft, and the valve drive shaft together orbit about the ring member of the positive displacement device.

15. The device according to claim 13, wherein the opening of the drive retainer is configured as a hole having a diameter, the diameter of the hole being larger than a largest diameter of the valve drive shaft at the forward end such that the valve drive shaft passes through the hole during installation, and the diameter of the hole being smaller than a largest, outmost trace defined by the valve drive shaft at the forward end as the valve drive shaft rotates and orbits around the ring member of the positive displacement device.

* * * * *